United States Patent [19]

McCabe et al.

[11] Patent Number: 4,492,083
[45] Date of Patent: Jan. 8, 1985

[54] GEOTHERMAL SALINITY CONTROL SYSTEM

[75] Inventors: Barkman C. McCabe, Los Angeles; Edward Zajac, Hollywood, both of Calif.

[73] Assignee: Magma Power Company, Los Angeles, Calif.

[21] Appl. No.: 170,105

[22] Filed: Jul. 18, 1980

[51] Int. Cl.³ .............................................. F03G 7/04
[52] U.S. Cl. ................................. 60/641.5; 60/641.2; 165/45
[58] Field of Search ................. 60/641.2, 641.5, 641.3; 165/45

[56] References Cited

U.S. PATENT DOCUMENTS

| | | | |
|---|---|---|---|
| 3,846,986 | 11/1974 | Anderson | 60/641.2 |
| 4,026,111 | 5/1977 | Matthews | 60/641.5 |
| 4,043,129 | 8/1977 | McCabe et al. | 60/641.2 |
| 4,211,613 | 7/1980 | Meckler | 165/45 X |

*Primary Examiner*—Stephen F. Husar
*Attorney, Agent, or Firm*—Albert L. Gabriel

[57] ABSTRACT

Highly saline geothermal brine, such as that produced from the lower geothermal reserve of the Salton Sea geothermal field, is diluted with non-geothermal water of much lower salinity in a mixing zone proximate the high temperature end of a geothermal power plant, and preferably down in the production well just above the production zone, so as to reduce the chloride salt content of the production brine to a level that is at or below the saturated level at reinjection temperatures, thereby preventing any material chloride salt scaling at any location in the plant through reinjection. The permanent cemented-in production casing in the well is protected against the corrosive effects of the hot production brine by means of a removable production liner that is generally coextensive with the casing. Said mixing zone is provided in the lower portion of the liner, and the liner establishes an annulus between it and the casing through which said non-geothermal water flows downwardly to the mixing zone so as to exclude the production brine from contact with the casing.

38 Claims, 2 Drawing Figures

GEOTHERMAL SALINITY CONTROL SYSTEM

BACKGROUND OF THE INVENTION

1. Field of the Invention

The invention is in the field of electrical power production from high temperature geothermal brines which have high dissolved chloride salt content.

2. Description of the Prior Art

There are certain geothermal resources that have been discovered in the world which contain large amounts of geothermal energy, but which have heretofore not been usable for the commercial production of electrical power because of a very high dissolved chloride salt content, and also because of a silica content which is proximate saturation at the high source temperatures. Such a geothermal resource is the lower geothermal reserve portion of the Salton Sea geothermal field in the Imperial Valley in California, wherein the geothermal brines produced below a depth of approximately 3,000 feet have very high source temperatures ranging from about 590° F. to about 675° F., contain from about 300,000 to about 360,000 parts per million by weight of chloride salts after the brine has been flashed to atmospheric pressure, with an average chloride salt content when flashed of approximately 325,000 parts per million, and contain silica proximate the saturated level in amounts of from about 550 to 600 parts per million by weight.

Although the lower reserve portion of the Salton Sea geothermal field is believed to be the largest single geothermal energy reserve in the world because of its very high temperatures, and the relatively large geographical area that it covers, and also because of its regenerative capacity, nevertheless commercial development of this resource has heretofore been considered impractical because flow tests from this resource have revealed that large amounts of sodium chloride and some potassium chloride would precipitate out as a hard, rock-like scaling in various parts of an electrical generating plant where temperature and pressure drops would occur, such as in production piping, steam separators, vessels, conduit joints, valves, instruments, and reinjection facilities. In a typical geothermal electric power generating plant, the geothermal brine would be cooled to approximately 212° F. after its thermal energy had been extracted in the plant and brine was conducted to reinjection equipment, and the maximum solubility of the chloride salts in this brine is only approximately 250,000 parts per million at this reinjection temperature. Accordingly, with the original chloride salt content averaging about 325,000 parts per million chloride salts, there would be an excess of about 75,000 parts per million chloride salts above the soluble amount at reinjection temperatures, of which the approximately 40,000 parts per million of sodium chloride could potentially precipitate out in an electric generating plant powered from this geothermal source.

To put into perspective just how serious this problem could be, preliminary engineering studies by Magma Power Company of Los Angeles, Calif. for a 20 megawatt plant utilizing geothermal brine from this lower geothermal reserve portion of the Salton Sea geothermal field indicate that the plant will utilize approximately 3,000,000 pounds of brine per hour. If sodium chloride in an amount of approximately 40,000 parts per million of this flow were to precipitate out in plant and reinjection equipment, that would amount to approximately 120,000 pounds per hour of precipitated chloride salts, which would, of course, cause severe plugging and disposal problems.

In addition to this plugging problem, the high chloride salt content of the lower Salton Sea geothermal reserve brines also presents a corrosion problem to plant equipment. This problem is particularly severe at the high temperatures of the production brine as it flows upwardly through the conventional cemented-in production casing of a geothermal well. In fact, experience of applicants indicates that the salinity of fluids flowing up through conventional carbon steel casings must be of a much lower order of magnitude, preferably not more than about 50,000 parts per million, at these high temperatures in order for such casings to have a satisfactory life expectancy.

Temperature reductions as thermal energy is extracted in a geothermal electric power generating plant are also accompanied by a reduction in the silica saturation amount in the brine, which tends to cause a silica scaling problem in plant and reinjection equipment, in addition to the chloride salt scaling problem referred to above.

Some attention was given to the matter of controlling mineral precipitation in connection with a geothermal electrical power plant in U.S. Pat. No. 3,757,516 issued to Barkman C. McCabe. That patent taught the principle of deep well pumping in a geothermal hot water production well and pressurization throughout the entire plant system on through reinjection primarily to avoid the loss of the heat of vaporization from that portion of the fluid which would otherwise flash to steam in the production well, but also to prevent mineral precipitation at any point in the entire flow path. However, the said McCabe U.S. Pat. No. 3,757,516 was concerned only with geothermal plants that produced electrical power from geothermal resources having temperatures under about 400° F., where the principal scaling problem involved the precipitation of carbonates in the production well bore and heat exchangers. Said McCabe U.S. Pat. No. 3,757,516 was not concerned with a very high temperature geothermal brine resource such as the lower reserve of the Salton Sea geothermal field, wherein the geothermal production brine has an extremely high chloride salt content that is much higher than the saturation level for reinjection temperatures, and also has a high, generally saturated silica content at production temperatures.

U.S. Pat. No. 4,043,129 issued to Barkman C. McCabe and Edward Zajac applied the deep well pumping concept of the earlier McCabe U.S. Pat. No. 3,757,516 to high temperature geothermal brines above about 500° F. The McCabe-Zajac U.S. Pat. No. 4,043,129 taught that the advantages of deep well pumping, including both avoidance of the loss of heat of vaporization and minimization of mineral precipitation, could be realized in connection with very high temperature geothermal brines by mixing a high temperature geothermal brine which might have a relatively high mineral content derived from a relatively deep well with a lower temperature geothermal brine that might have a relatively lower mineral content derived from either a shallower geothermal well or a peripheral geothermal well, to produce a brine mixture of sufficiently lowered temperature to be within the practical temperature and pressure ranges for pumping, and would incidentally have a lowered mineral proportion. The minerals with which the said McCabe-Zajac U.S. Pat. No. 4,043,129 was principally concerned were, as with the earlier McCabe U.S. Pat. No. 3,757,516, carbonates. Regarding the chloride salt content of the brine, and incidentally the silica content thereof, said McCabe-Zajac U.S. Pat. No. 4,043,129 simply says (at column 18, lines 16–23) that where the chloride salt content of the geothermal brine is below about 250,000 parts per million, it is generally not too corrosive for use in available heat exchangers, provided the silica content of the fluid is sufficiently low. Then, said McCabe-Zajac U.S. Pat. No. 4,043,129 teaches (at column 24, line 66 to column 25, line 7) that where a geothermal brine is too corrosive or has too high a silica content for liquid-to-liquid heat exchangers, this can be overcome by flashing the fluid to steam in steam separators of a type that can be easily cleaned out on a periodic basis, and then the heat energy from the steam used for generating power.

Thus, the prior McCabe-Zajac U.S. Pat. No. 4,043,129 recognizes that if there is too much chloride salt content in a high temperature geothermal brine, then there will be corrosion and mineral fallout problems, and recognizes that the method taught therein of mixing the high temperature brine of a deep geothermal production well with the lower temperature brine of a shallower or peripheral geothermal production well does not solve either the chloride salt or the silica problem. To the contrary, it would be impractical to attempt to solve the problem of the very high chloride salt and silica contents of a high temperature geothermal resource like the lower Salton Sea geothermal reserve by mixing the brine from that resource with geothermal brine from an upper or peripheral reserve which may have lesser mineral content, for a number of reasons. First, in order to provide such upper or peripheral reserve geothermal brine, it would be necessary to drill and case a well to considerable depth, at considerable expense. Second, in order to prevent flashing and consequent plugging in such upper or peripheral resource well, it would be necessary to employ down-hole pumping, at considerable expense in both equipment and power consumption. Two upper reserve wells drilled by Magma Power Company in the Salton Sea geothermal field at approximately 1,500-foot and 2,100-foot depths produced geothermal brines with respective chloride contents of approximately 170,000 parts per million and 220,000 parts per million. Such huge amounts of upper reserve brines of this character would be required to be combined with a lower reserve brine having an average of about 325 parts per million chloride salt content to reduce the average chloride salt content to below about 250,000 parts per million that pumping equipment and plant size would become much too large to be practical. Even then, the highly corrosive character of such upper reserve brines injected in the annulus between the production casing and pump string according to said McCabe-Zajac U.S. Pat. No. 4,034,129 would seriously limit the operational life of not only the high temperature lower reserve well, but also of the lower temperature upper reserve well. It is estimated that if such dilution by an upper zone geothermal brine were employed, the lower section of the production casing of the lower reserve well would be completely eaten out by corrosion, and that section of the well would have to be redrilled and recased at least about every five years.

SUMMARY OF THE INVENTION

In view of these and other problems in the art, it is a general object of the present invention to make available for the first time for the production of electrical power on a commercial basis, a large, high temperature geothermal resource such as the lower geothermal reserve portion of the Salton Sea geothermal field, in which a very high dissolved chloride salt content, and also a high dissolved silica content, have heretofore made commercial electrical power production impractical.

Another object of the invention is to provide method and apparatus for reducing the salinity of high temperature, high salinity brines such as are produced in the lower geothermal reserve of the Salton Sea geothermal field, to a sufficiently lower level that for the first time it is commercially feasible and practical to utilize the huge amount of thermal power available in such geothermal brines for driving electrical power generators.

A further object of the invention is to reduce the proportion of chloride salts in high temperature, highly saline geothermal brines of the character described, down to a level that is at or below the saturated level for the chloride salts at reinjection temperatures, whereby no material chloride salt scaling will occur in brine gathering systems, plant or reinjection facilities.

A further object of the invention is to provide method and apparatus of the character described for reducing the salinity of high temperature, highly saline lower reserve geothermal brines wherein the production casing of the well is substantially insulated from the corrosive effects of the high temperature, high salinity production brine, so as to greatly extend the operational life of the production well.

A still further object of the invention is to provide method and apparatus of the character described for reducing the chloride salt content of high temperature, highly saline lower reserve geothermal brines so as to reduce salt scaling and corrosion problems in an electrical power generating plant energized by such brines, which at the same time causes a reduction in the proportion of dissolved silica in the brines and a consequent reduction in silica scaling problems in the plant.

According to the invention, high temperature, highly saline geothermal brine, such as that produced from the lower geothermal reserve portion of the Salton Sea geothermal field, is diluted with "fresh water" proximate the high temperature end of a geothermal power plant, and preferably down in the geothermal production well just above the production zone, so as to reduce the chloride salt content of the production brine to a level that is at or below the saturated level at reinjection temperatures, so as to prevent any material chloride salt scaling at any location in the plant through reinjection. The "fresh water" may be from one or more of a variety of available sources. Thus for a geothermal power plant at the Salton Sea geothermal field, the "fresh water" may be irrigation water, surface or subsurface irrigation drainage water, Salton Sea water, or the like.

The invention is applicable to geothermal electric power plants where heat is extracted from the geothermal brine by flashing some of the brine to steam, and then either directly generating electrical power with steam turbines or transferring heat energy from the flashed steam in heat exchangers to one or more power or working fluids in a binary system. In those forms of the invention where some of the brine is flashed to steam, reinjection temperatures will generally not go below about 212° F., so that the brine is diluted with "fresh water" down to a chloride salt content of not more than about 250,000 parts per million, which is approximately the saturated level for that temperature, and is preferably diluted at least down to about 240,000 parts per million to provide a margin of safety.

In the presently preferred form of the invention, a removable, sacrificial production liner in the geothermal production well is subjected to the corrosive effects of the high temperature, highly saline production brine in lieu of the cemented-in production casing which is usually subjected to the corrosive effects of the production brine in a conventional geothermal well. This production liner is suspended from the wellhead down through the production casing so as to define an annulus between the liner and the casing. The "fresh water", which may have a saline content up to about 50,000 parts per million but preferably not more than about 35,000 parts per million, is pumped from the wellhead through the length of the annulus so as to isolate the cemented-in casing from the highly corrosive production brine, the "fresh water" entering the lower portion of the production liner through perforations therein so as to mix with and dilute the production brine as the latter flows upwardly through the production liner to the wellhead for delivery to the plant. By this means, the operational life of the production casing, and hence of the well itself, is greatly extended, while at the same time chloride salt scaling in the plant and reinjection equipment is substantially completely eliminated, and the diluted condition of the brine reduces its corrosive and silica scaling effects through the plant and reinjection equipment.

BRIEF DESCRIPTION OF THE DRAWINGS

These and other objects of the invention will become apparent in view of the following description and the accompanying drawings, wherein.

DETAILED DESCRIPTION

Figure 1:
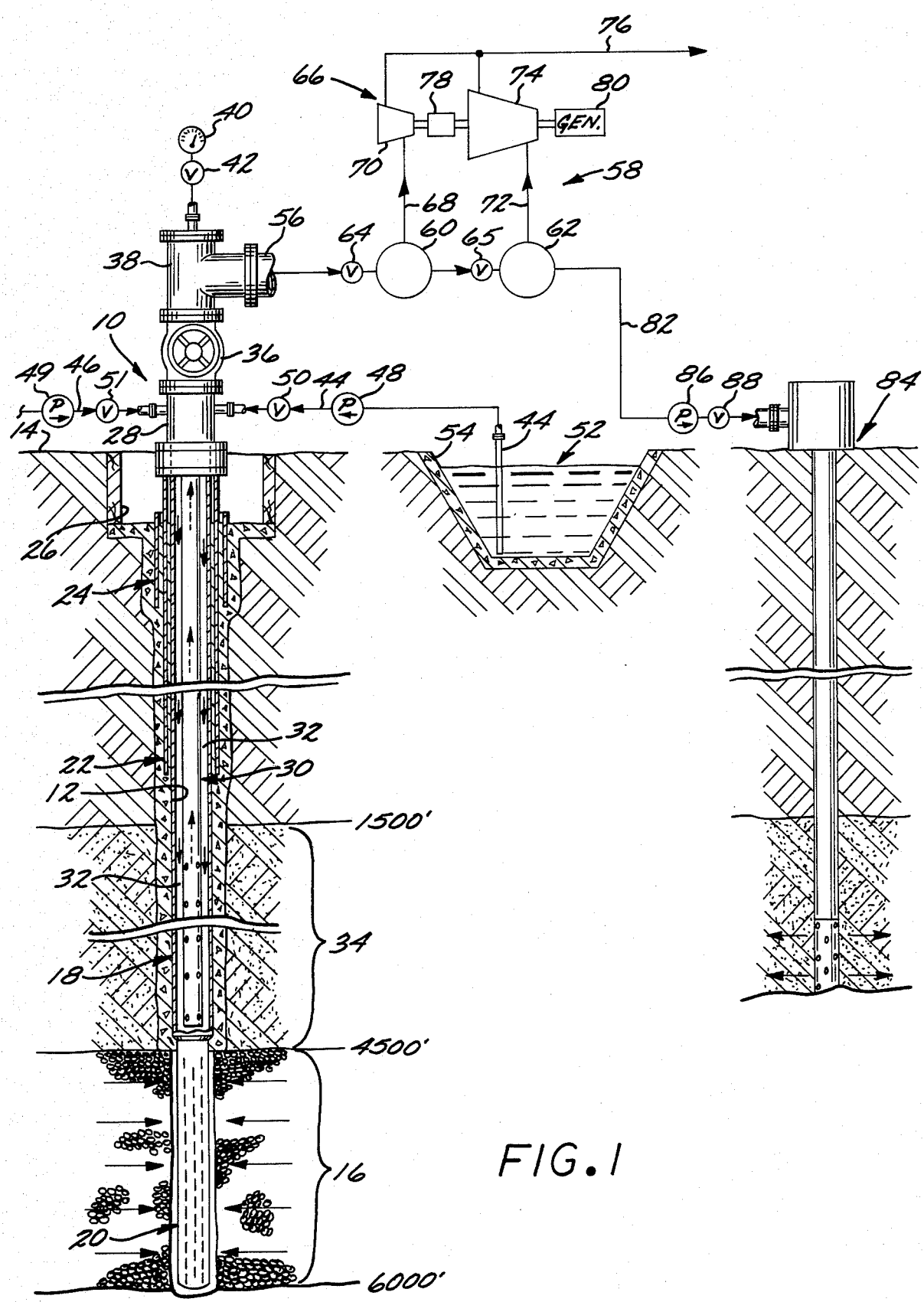
FIG. 1 is a diagrammatic view illustrating one form of the present invention wherein the hot geothermal brine of controlled salinity is delivered from the production liner of the invention to heat extraction and generating means of the type in which a portion of the hot brine is flashed to steam and such steam directly drives steam turbine generating apparatus.

FIG. 1 of the drawings shows a first form of the present invention wherein a geothermal production well generally designated 10 provides underground access to very hot geothermal brine of the type to which the present invention is applicable, namely, hot geothermal brine which has a saline content greater than about 250,000 ppm (parts per million) by weight, so that without the present invention chloride salts would precipitate out as scaling in plant and reinjection equipment. An example of a geothermal resource to which the present invention is applicable is the lower geothermal reserve portion of the Salton Sea geothermal field, sometimes referred to as the "Salton Sea geothermal anomaly", located in the Niland region of the Imperial Valley in California. For the purposes of the present invention, this lower reserve portion of the Salton Sea geothermal field extends from a depth of approximately 3,000 feet down to 10,000 feet or much deeper. The proven resource area of this lower Salton Sea geothermal reserve is about seven miles long and three miles wide, and the area of this resource may be several times as large as this proven area. This lower reserve portion of the Salton Sea geothermal field is believed to be the largest single geothermal energy reserve in the world, and may even be the largest single energy resource of any kind in the world.

Despite the huge amount of geothermal energy available in this type of geothermal resource, this resource has heretofore not been usable for the commercial production of electrical power because of its excessively high mineral content, including from about 300,000 to about 360,000 ppm of chloride salts after the geothermal brine has been flashed to atmospheric pressure, with an average chloride salt content when flashed of approximately 325,000 ppm. The higher saline contents are in the deeper portions of this reserve because of settling. These chloride salts in the brine are predominantly sodium chloride, calcium chloride and potassium chloride, in relative quantities of approximately 4 parts sodium chloride, 2 parts calcium chloride and 1 part potassium chloride.

The tremendous amount of thermal energy available from this lower reserve geothermal resource in the Salton Sea field results from the very high temperatures of from about 590° F. to about 675° F. (the critical temperature for water is approximately 703° F.), the extensive area of between about 10,000 and 20,000 acres, and the great depth range of from approximately 3,000 feet to 10,000 feet or much deeper. This thermal energy resource is regenerating in character, and it is estimated by persons knowledgeable in the art that this resource will last without substantial diminution for more than a thousand years.

A geothermal well drilled by Magma Power Company of Los Angeles, California providing access to geothermal brine at a depth of approximately 4,000 feet in this lower Salton Sea geothermal reserve produces brine having a source temperature of approximately 620° F. with a chloride salt content of approximately 300,000 ppm when flashed. Flow tests of the hot brine from this well through a simulated geothermal electrical power production plant resulted in large amounts of sodium chloride precipitating as scaling in various parts of the plant where pressure drops occurred, including production piping, steam separators, vessels, conduit joints, valves, instruments and the like. Most of this chloride salt scaling is sodium chloride, because it is the least soluble of the three principal chloride salts present in the brine. Some potassium chloride salt scaling may occur, this being the next soluble of the principal chlorides present. The calcium chloride will generally all remain in solution at the brine temperatures in a geothermal electrical power production plant.

Figure 2:
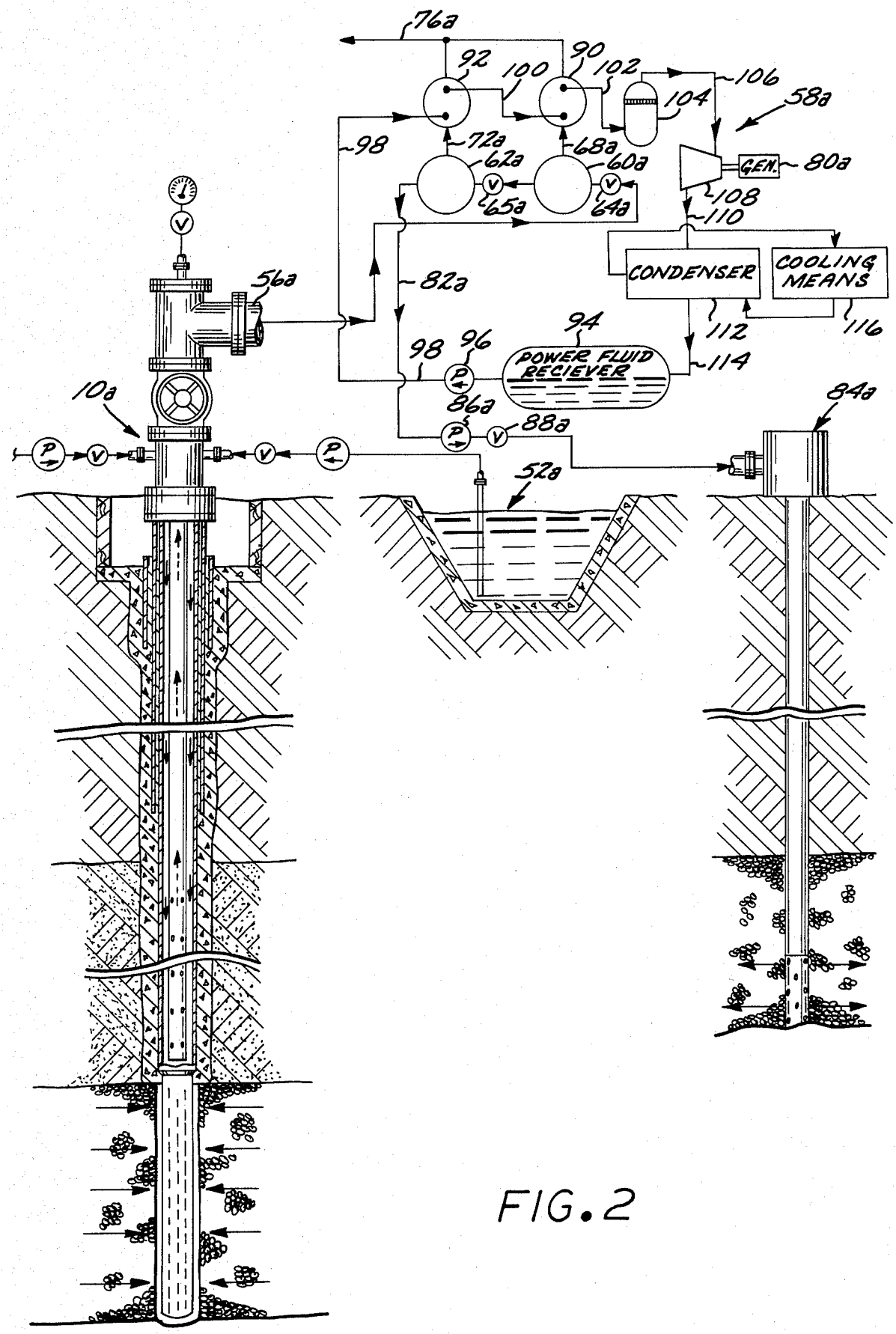
FIG. 2 is a diagrammatic view illustrating another form of the invention wherein the hot geothermal brine of controlled salinity is delivered from the production liner of the invention to heat extraction and generating means of a binary type wherein a portion of the hot brine is flashed to steam and heat is transferred from the steam to one or more power or working fluids which then drive turbine generating apparatus.

The chloride salt solubility scales show that at approximately 212° F., for the chloride salt composition of the lower reserves of the Salton Sea geothermal field, the maximum solubility of the chloride salts is approximately 250,000 ppm, and for chloride salt proportions above about 250,00 ppm sodium chloride will precipitate out in amounts corresponding to the proportion of sodium chloride that is present in the brine above about 250,000 ppm. In the forms of the invention that are shown in FIGS. 1 and 2 the geothermal brine is flashed to steam, for direct steam generating of electrical power in the form shown in FIG. 1, and for heat exchange to a power or working fluid in a binary system in the form shown in FIG. 2. In these two forms of the invention, the brine reinjection temperature will be approximately 212° F. or slightly higher, so that if the proportion of chloride salts in the brine after flashing is not more than about 250,000 ppm, there will be no material sodium chloride scaling in plant or reinjection equipment. To assure against any material sodium chloride scaling of plant or reinjection equipment where the plant is of the type shown in FIG. 1 or FIG. 2 in which the brine is flashed to steam, it is preferred that the brine be diluted according to the invention with "fresh water" in the production well to a chloride salt proportion not greater than approximately 240,000 ppm by weight.

By way of comparison, one upper geothermal reserve well drilled by Magma Power Company to a depth of approximately 2,100 feet in the Salton Sea geothermal field produces geothermal brine at a temperature of about 515° F. to 520° F., with a chloride salt content of approximately 220,000 ppm consisting of approximately 4 parts sodium chloride, 2 parts calcium chloride and 1 part potassium chloride. Another upper reserve well drilled by Magma Power Company in the Salton Sea geothermal field to a depth of approximately 1,500 feet produces geothermal brine at a source temperature of approximately 392° F., with approximately 175,000 ppm chloride salts consisting of approximately 4 parts sodium chloride, 2 parts calcium chloride and 1 part potassium chloride. While the chloride salt content of these upper reserve brines is well below the approximately 240,000 ppm upper limit for forms of the present invention like those shown in FIGS. 1 and 2 where the brine is flashed to steam for heat energy extraction, nevertheless, the thermal energy output of these upper reserve brines is very small compared to the energy output of the lower reserve brines, and the chloride salt content is still at levels that are highly corrosive to plant equipment, and particularly to the permanent production well casing. The present invention not only opens up the great thermal energy resource of the lower Salton Sea field reserve by eliminating the chloride salt scaling problem, but it also greatly reduces the vulnerability to corrosion of the permanent, cemented-in production casings of geothermal production wells providing access to this lower reserve, thereby greatly extending well life and minimizing the otherwise very large expense of periodically having to redrill and case new wells.

Referring again to FIG. 1, the geothermal brine production well 10 will be assumed by way of example only, and not of limitation, to be in the Salton Sea geothermal field in the Niland region of the Imperial Valley, and to provide access to the said high temperature, high salinity lower reserve portion of that geothermal field at a depth range of from about 4,500 feet to about 6,000 feet. The geothermal production well 10 includes a well bore 12 extending down from the surface 14 of the ground to a hot geothermal brine production zone generally designated 16 which in the present example is a porous formation of sand and shale between the said depths of about 4,500 feet and 6,000 feet. It will be assumed for the present example that the hot geothermal brine in production zone 16 has an average temperature of approximately 600° F. and an average chloride salt proportion upon flashing to atmospheric pressure of approximately 325 ppm by weight.

A production casing 18 is cemented in along its entire length from proximate the surface 14 down to proximate the beginning of the production zone 16. This production casing 18 must, according to the present state of the art, be made of carbon steel, and is therefore vulnerable to corrosion from hot geothermal brine having a relatively high chloride salt content, namely, a chloride salt content of more than about 50,000 ppm. Extending downwardly in the well bore 12 from the lower end of production casing 18 is a slotted liner 20 which extends through the vertical extent of the production zone 16. The hot geothermal brine in production zone 16 is under high pressure due to the weight of the overhead earth formations, hydrostatic pressure, and the thermal activity in the zone, which will cause the hot brine to flow from the formation into the slotted liner 20 and upwardly through the production casing 18. In the form of the invention shown in FIG. 1, the hot brine is allowed to flash in the production casing 18, and a small amount of flashing that will occur in the casing will provide the power necessary to deliver the hot brine to the wellhead at substantial pressure.

Cemented concentrically about the production casing 18 are a surface casing 22 and a conductor 24 which extend upwardly into an upwardly opening cellar 26. An expansion spool 28 is connected to the top of production casing 18 at the wellhead, and suspended from this expansion spool 28 is a tubular production liner 30 which is longitudinally substantially coextensive with the production casing 18 and has an outside diameter that is smaller than the inside diameter of production casing 18 so as to define an annulus 32 between production liner 30 and production casing 18. Production liner 30 has a perforated section generally designated 34 which serves as a mixing zone for mixing "fresh water" that is pumped down through the annulus 32 from the wellhead with hot geothermal brine that flows upwardly from the production zone 16 into the production liner 30. This perforated section 34 extends from the free lower end of liner 30 preferably upwardly along a considerable proportion of the length of liner 30, as for example on the order of about two-thirds of the length of liner 30.

The production liner 30 is removably attached at its upper end in the expansion spool 28 so that when it becomes damaged to the extent that its utility is diminished by exposure to the corrosiveness of the high salinity geothermal brine, it can be readily removed from the well and replaced by a new production liner 30. As will become clear from the following description, the removable production liner 30 takes the place of the production casing 18 insofar as exposure to the highly corrosive, high salinity geothermal production brine is concerned, so that the permanently cemented-in production casing 18 will be subjected to only minimal activity from corrosive agents compared to the large amount of corrosive activity to which the production casing is subjected in a conventional geothermal well.

The upper end of production liner 30 is connected through production valve 36 to production tee 38 for delivery of the high temperature geothermal brine of reduced, controlled salinity. The wellhead pressure may be monitored by a pressure gauge 40 connected to production tee 38 through a valve 42.

A pair of "fresh water" inlet conduits 44 and 46 are connected to expansion spool 28 so that each is in communication with the upper end of annulus 32 between production liner 30 and production casing 18. "Fresh water" is delivered to the annulus 32 through either or both of the inlet conduits 44 and 46 by respective pumps 48 and 49 through respective control valves 50 and 51. In FIG. 1 the "fresh water" inlet conduit 44 is diagrammatically illustrated in communication with a source 52 of "fresh water" which, for the purpose of the illustration, is shown contained in a drainage ditch 54. Although a "fresh water" source has not been shown for the inlet conduit 46, it is to be understood that the inlet conduits 44 and 46 may either have the same "fresh water" source or different "fresh water" sources.

The "fresh water" is pumped through conduits 44 and 46 by respective pumps 48 and 49 at sufficient pressure to cause the "fresh water" to flow downwardly through the annulus 32 and into the production liner 30 through the perforations in its perforated section 34 so as to mix with the upwardly flowing high temperature, high salinity geothermal brine. The flow rate of this "fresh water" is controlled by the valves 50 and 51 according to the flow rate of the high temperature production brine, the salinity of the production brine and the salinity of the "fresh water" so as to dilute the salinity of the geothermal production fluid delivered at production tee 38 down to a salinity that will not cause sodium chloride scaling in plant or reinjection equipment. As indicated above, this reduced salinity of the production fluid is to be not more than about 250,000 ppm of chloride salts after flashing, and preferably not more than about 240,000 ppm chloride salts after flashing, in the forms of the invention where the geothermal production brine is flashed to steam in the heat extraction procedure, and less in forms of the invention where the system is pressurized and the temperature of the production brine is brought below the boiling point in the heat extraction procedure.

By having the production liner 30 extend downwardly through substantially the entire length of the production casing 18, and pressurizing the "fresh water" that flows downwardly through the annulus 32 by pumps 48 and 49 to a pressure which, together with the weight of the "fresh water" column in the annulus 32, is at least as great as or greater than the pressure of the high temperature geothermal brine in situ proximate the lower end of the production casing 18, substantially the entire length of the production casing 18 will be coated with "fresh water" to the exclusion of the production brine produced in the production zone 16. In this manner substantially the entire length of the production casing 18 is protected from corrosive action by the high temperature, high salinity geothermal production brine, and the removable production liner 30 is instead subjected to such corrosive action. Thus, with regard to corrosion, the production liner 30 may be considered to be a sacrificial casing. Since the production liner 30 may be readily removed and replaced, its life expectancy time before replacement is not of major importance, and it can therefore be of relatively thin, lightweight construction for easy handling, and can be made of a conventional well equipment material such as carbon steel.

It is preferred that the "fresh water" pumped down through the annulus 32 for protecting the production casing 18 and for diluting the high temperature, high salinity geothermal production fluid in the mixing zone 34 be as "fresh" as possible, i.e., have a minimum of chloride salt content, for several reasons. First, the "fresh water" source must be non-geothermal in character, so that the "fresh water" will be proximate ambient temperature, or possibly even somewhat below ambient temperature because of evaporative cooling from its surface. The lower the salinity of this "fresh water", the less of it is required to dilute the high temperature, high salinity geothermal production brine down to the reduced salinity of the present invention, and hence the less thermal energy loss to the power plant from cooling of the high temperature geothermal brine. Also, by minimizing the amount of "fresh water" that must be added to the geothermal production brine, the total flow volume of fluid through the plant will be minimized, and the size, and hence expense of plant equipment may correspondingly be minimized.

Extensive experience of applicants in drilling, casing and flowing geothermal brine wells in the Imperial Valley indicates that if the salinity of a brine is not more than about 50,000 ppm, then a carbon steel casing will have a satisfactory life expectancy of many years before a well must be abandoned and a new well drilled and cased. Accordingly, it is preferred that the "fresh water" that is pumped down into the annulus 32 have a chloride salt content no greater than about 50,000 ppm, and much less if a suitable source is available. By employing a "fresh water" source that is non-geothermal in character, and hence proximate ambient temperature, the downflowing water that is in contact with the production casing 18 will have a much lower temperature than the geothermal brine produced in the production zone 16, and this lower temperature will help to minimize any corrosive action of the "fresh water" on the production casing 18. The temperature of the "fresh water" will increase from ambient as the water flows down through the increasingly hot earth formations, but because of its rapid flow rate through these formations it will still remain much cooler than the source temperature of the production brine even proximate the lower end of production casing 18.

Accordingly, for the purpose of the present invention, "fresh water" is hereby defined to be non-geothermal water having a chloride salt salinity not greater than approximately 50,000 ppm by weight.

Several satisfactory sources of "fresh water" are available near the Salton Sea geothermal field. A source having minimal saline content is Imperial Valley irrigation water, which is derived from the Colorado River. Another very satisfactory source of "fresh water" is a huge volume of drainage ditch water from irrigating in the Imperial Valley, which generally has between about 2500 ppm and 3500 ppm chloride salt content. Use of this drainage ditch water for the present invention would be welcomed by the Imperial Valley community, because it is presently causing a continuous rise in the level of the Salton Sea, which is damaging shoreline properties.

Imperial Valley irrigation drainage water of somewhat higher salinity is also available through shallow water wells which do not extend down far enough to be considered geothermal in nature. Thus, for example, water wells to depths on the order of about 100 to 200 feet will produce virtually unlimited quantities of irrigation drainage water having chloride salt contents in the range of from about 5,000 ppm to about 20,000 ppm, which is still well within the scope of the present invention.

Another source of "fresh water" for use in the present invention is Salton Sea water, which has approximately 35,000 ppm chloride salt content, about the same as ocean water. While the outside limit for the amount of chloride salts in the "fresh water" of the present invention is about 50,000 ppm as indicated above, it is preferred that the chloride salt content be not greater than approximately 35,000 ppm.

By way of example, it will be assumed that geothermal production brine having 325,000 ppm chloride salt content is to be diluted according to the invention down to 240,000 ppm chloride salt content with "fresh water" that has no chloride salt content. The number of parts "fresh water" (FW) required per million parts of the 325,000 ppm production brine to accomplish this may be determined as follows:

$$\frac{240}{10^6} = \frac{325}{10^6 + FW}$$

or $$FW = 325 \times \frac{10^6}{240} - 10^6$$

or $$FW = 1.354 \times 10^6 - 10^6$$

or $FW = 354{,}000$ parts per million parts geothermal production brine

Thus, the rate of flow of "fresh water" will be 35.4% of the rate of flow of the geothermal production brine to accomplish reduction of saline content from 325,000 ppm down to 240,000 ppm. The added "fresh water" will then be 354,000 divided by 1,354,000 or 26.1% of the total liquid delivered to the electric power generating plant through production tee 38, while the production brine from zone 16 then will constitute 73.9% of the total liquid flow. If 2500 ppm to 3500 ppm irrigation ditch water were used, there would not be much difference in these percentages.

For this same example, if it is assumed that the temperature of the geothermal production brine from zone 16 is 600° F. and the temperature of the "fresh water" is 100° F., then the temperature of the combined liquid flow delivered at production tee 38 will be:

26.1% of 100° F. + 73.9% of 600° F.

= 26.1F. + 443.4° F.

= 469.5° F.

The actual temperature of the combined liquids will be somewhat higher than this figure because of heat picked up from the increasingly hot surrounding formations by the "fresh water" as it flows down through the annulus 32.

Another important gain that is achieved by the use of non-geothermal "fresh water" is that it is practically free of silica, so that when it is combined with the production brine the silica content of the liquid furnished to the plant will be considerably reduced from that of the production brine. The high temperature brines in the lower reserve of the Salton Sea geothermal field are substantially saturated with silica at the production zone temperatures, and heretofore it has been a difficult problem to cope with the silica that has precipitated out with temperature reductions in the form of scaling in plant and reinjection equipment. In the above example, the addition of the 26.1% "fresh water" in the total liquid flow will result in a proportional 26.1% reduction in the number of parts per million of silica in the total flow, which will considerably lessen the silica problem in the plant.

Returning to FIG. 1, the diluted, hot geothermal brine of regulated or controlled salinity is delivered from production tee 38 through a conduit 56 to heat extraction and generating means generally designated 58. In this form of the invention the geothermal brine is flashed to steam for direct steam generating of electrical power. This is accomplished by passing the hot geothermal brine from delivery conduit 56 through a series of steam separators 60 and 62 which have respective flash control valves 64 and 65 associated therewith, flashed steam from separators 60 and 62 driving steam turbine apparatus generally designated 66. Steam from the first steam separator 60 is delivered through steam conduit 68 to a high pressure condensing steam turbine stage 70, while steam from the second steam separator 62 is delivered through steam conduit 70 to a low pressure condensing turbine stage 74. The exhaust from condensing turbine stages 70 and 74 is distilled water, which may be collected in a conduit 76 as a byproduct of the system that is very useful as cooling water. The turbine stages 70 and 74 are coupled through a synchronizer 78 and together they drive an electric power generator 80. Alternatively, steam from the second, low pressure steam separator 62 may be passed through a heat exchanger to heat a power or working fluid in a binary power system.

After steam separation, the remaining geothermal brine then passes from steam separator 62 through a reinjection conduit 82 to a reinjection well generally designated 84, the reinjection brine being pumped into the reinjection well 84 by a pump 86 at a flow rate controlled by a valve 88.

In the embodiment of the invention shown in FIG. 2, the diluted hot geothermal brine is flashed to steam for heat exchange to a power or working fluid in a binary system. In this embodiment of the invention, the geothermal production well generally designated 10a may be same as the geothermal production well 10 shown in FIG. 1. The "fresh water" source 52a may likewise be any one or more of the types of "fresh water" sources discussed hereinabove in connection with FIG. 1.

In the form of the invention shown in FIG. 2, the diluted hot geothermal brine of controlled salinity is delivered through a conduit 56a to heat extraction and generating means generally designated 58a in which a portion of the brine is flashed to steam which is conducted in heat exchange relationship with one or more power or working fluids. Thus, the hot geothermal brine passes from delivery conduit 56a through a series arrangement of steam separators 60a and 62a which have respective flash control valves 64a and 65a associated therewith. Separated steam from the first steam separator 60a is conducted through steam conduit 68a to a first heat exchanger 90 wherein heat energy from the steam is tranferred to a power or working fluid. Similarly, separated steam from the second steam separator 62a is conducted through steam conduit 72a to a second heat exchanger 92 for transferring heat energy from the steam to the power or working fluid. The waste steam from heat eschangers 90 and 92 may be collected in a conduit 76a for condensation into distilled water as a byproduct of the system. After steam separation, the remaining geothermal brine passes through reinjection conduit 82a having pump 86a and valve 88a therein to reinjection well 84a.

The power fluid circuit in heat extraction and generating means 58a includes a liquid power fluid receiver 94 from which the power fluid is pumped to a high pressure by a pump 96 and delivered through a conduit 98 to the heat exchanger 92, which is the lower temperature heat exchanger in which the power fluid is preheated and may be partially or entirely vaporized. The power fluid then passes through a conduit 100 to the higher temperature heat exchanger 90 in which vaporization of the power fluid is completed and the power fluid is superheated. The superheated power fluid passes from heat exchanger 90 through K.O. tank 104 and conduit 106 to power fluid turbine 108 which drives electric power generator 80a. The power fluid passes from turbine 108 through conduit 110 to condenser means 112 where it is liquified and then delivered through conduit 114 to the power fluid receiver 94. The waste heat that is extracted from the power fluid in condenser means 112 is rejected in cooling means 116 such as cooling tower, cooling pond or the like.

The heat extraction and generating means 58 of FIG. 1 and 58a of FIG. 2 are similar to corresponding apparatus that is shown and described in considerably greater detail in said McCabe U.S. Pat. No. 3,757,516 and said McCabe and Zajac U.S. Pat. No. 4,043,129. Additionally, the use of various power or working fluids and combinations thereof is described in detail in said U.S. Pat. Nos. 3,757,516 and 4,043,129. Said U.S. Pat. Nos. 3,757,516 and 4,043,129 are each hereby incorporated by reference in their entireties in the present application so as to include such detailed disclosures in said U.S. Pat. Nos. 3,757,516 and 4,043,129 as part of the disclosure in the present application.

In the forms of the invention like FIGS. 1 and 2 wherein a portion of the mixture of geothermal brine and non-geothermal "fresh water" is flashed to steam, there is an environmental advantage over conventional brine flash systems in that the added "fresh water" approximately makes up for the amount of liquid lost to steam, so that the volume of reinjection fluid returned to the aquifer will approximately equal the amount of geothermal production fluid withdrawn from the aquifer. Then the waste steam need not be condensed and recombined with the flow stream to make up the reinjection volume, but may instead be made available as a valuable byproduct of the system, or may simply be vented to atmosphere.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

We claim:

1. The method of reducing mineral scaling and corrosion in a geothermal energy system having a production well that provides access to an underground source of high temperature, highly saline geothermal brine and heat extraction means connected to said production well to receive said brine from said well, which comprises mixing non-geothermal water with said geothermal brine at a location in said system upstream of said heat extraction means, said non-geothermal water being much less saline than said geothermal brine.

2. The method of claim 1, wherein said highly saline geothermal brine has a chloride salt content of greater than approximately 250,000 ppm by weight upon being flashed to atmospheric pressure, and said non-geothermal water has not more than approximately 50,000 ppm by weight of chloride salt content.

3. The method of claim 2, wherein said non-geothermal water has not more than approximately 35,000 ppm by weight of chloride salt content.

4. The method of claim 2, wherein said non-geothermal water has not more than approximately 20,000 by weight of chloride salt content.

5. The method of claim 2, wherein said non-geothermal water has not more than approximately 3500 ppm by weight of chloride salt content.

6. The method of claim 1, wherein said highly saline geothermal brine has a chloride salt content of from about 300,000 to about 360,000 ppm by weight upon being flashed to atmospheric pressure, and said non-geothermal water has not more than approximately 35,000 ppm by weight of chloride salt content.

7. The method of claim 1, wherein said non-geothermal water is mixed with said geothermal brine in sufficient proportion to reduce the chloride salt content of the mixture to not more than approximately 250,000 ppm by weight upon being flashed to atmospheric pressure.

8. The method of claim 7, wherein the chloride salt content of said mixture is reduced to not more than approximately 240,000 ppm by weight upon being flashed to atmospheric pressure.

9. The method of claim 1, wherein said non-geothermal water has not more than approximately 35,000 ppm by weight of chloride salt content.

10. The method of claim 1, wherein said non-geothermal water has not more than approximately 20,000 ppm by weight of chloride salt content.

11. The method of claim 1, wherein said non-geothermal water has not more than approximately 3500 ppm by weight of chloride salt content.

12. The method of claim 1, wherein heat energy is extracted from the mixture of said geothermal brine and non-geothermal water in said heat extraction means by flashing a portion of said mixture to steam.

13. The method of claim 12, wherein said steam is used to directly drive steam turbine means.

14. The method of claim 12, wherein heat energy from said steam is transferred to a power fluid in a binary system, and said power fluid is used to drive turbine means.

15. The method of reducing mineral scaling and corrosion in a geothermal energy system having a production well that provides access to an underground source of high temperature, highly saline geothermal brine and heat extraction means connected to said production well to receive said brine from said well, which comprises mixing non-geothermal water with said geothermal brine at a location in said system upstream of said heat extraction means, said non-geothermal water being much less saline than said geothermal brine, said upstream location in the system being down in said production well above said geothermal source.

16. The method of claim 15, which comprises protecting a production casing that is cemented in said well from corrosive effects of said geothermal brine by flowing and annular layer of said non-geothermal water against the inner annular surface of said casing, and mixing said non-geothermal water with said geothermal brine and flowing the mixture up to the top of the well radially inwardly of said annular layer of non-geothermal water.

17. The method of claim 16, wherein said non-geothermal water has not more than approximately 50,000 ppm by weight of chloride salt content.

18. The method of reducing mineral scaling and corrosion in a geothermal energy system having a production well that provides access to an underground source of high temperature, highly saline geothermal brine and heat extraction means connected to siad production well to receive said brine from said well, which comprises mixing non-geothermal water with said geothermal brine at a location in said system upstream of said heat extraction means, said non-geothermal water being much less saline than said geothermal brine, said upstream location in the system being down in said production well above said geothermal source, protecting a production casing that is cemented in said well from corrosive effects of said geothermal brine by flowing an annular layer of non-geothermal water against the inner annular surface of said casing, and mixing said non-geothermal water with said geothermal brine and flowing the mixture up to the top of the well radially inwardly of said annular layer of non-geothermal water, and utilizing a removable liner within said casing to establish an annulus through which said annular layer of non-geothermal water is flowed and to define an inner passage in which said mixing and flowing of said mixture occur.

19. The method of claim 18, which comprises conducting said non-geothermal water radially inwardly from said annulus into said inner passage through perforations in said liner for mixing with said geothermal brine.

20. In a geothermal energy system having a production well that provides access to an underground source of high temperature, highly saline geothermal brine and heat extraction means connected to said production well to receive said brine from said well, a system for reducing mineral scaling and corrosion which comprises:

a source of non-geothermal water that is much less saline than said geothermal brine, a fluid mixing zone in said system upstream of said heat extraction means, conduit means extending from said source of non-geothermal water to said fluid mixing zone, and means for moving said non-geothermal water from its said source through said conduit means into said mixing zone for mixing with and reducing the salinity of said geothermal brine.

21. The system of claim 20, wherein said means for moving said non-geothermal water comprises pump means in said conduit means.

22. The system of claim 20, wherein said highly saline geothermal brine has a chloride salt content of greater than approximately 250,000 ppm by weight upon being flashed to atmospheric pressure, and said non-geothermal water has not more than approximately 50,000 ppm by weight of chloride salt content.

23. The system of claim 22, wherein said non-geothermal water has not more than approximately 35,000 ppm by weight of chloride salt content.

24. The system of claim 22, wherein said non-geothermal water has not more than approximately 20,000 ppm by weight of chloride salt content.

25. The system of claim 22, wherein said non-geothermal water has not more than approximately 3500 ppm by weight of chloride salt content.

26. The system of claim 20, wherein said highly saline geothermal brine has a chloride salt content of from about 300,000 to about 360,000 ppm by weight upon being flashed to atmospheric pressure and said non-geothermal water has not more than approximately 35,000 ppm of chloride salt content.

27. The system of claim 20, wherein said means for moving said non-geothermal water provides the latter in sufficient proportion to the production rate of said geothermal brine by said well to reduce the chloride salt content of the mixture of said brine and said water to not more than approximately 250,000 ppm by weight upon being flashed to atmospheric pressure.

28. The system of claim 27, wherein the chloride salt content of said mixture is reduced to not more than approximately 240,000 ppm by weight upon being flashed to atmospheric pressure.

29. The system of claim 20, wherein said heat extraction means comprises means for flashing a portion of the mixture of said geothermal brine and said non-geothermal water to steam.

30. The system of claim 29, which comprises steam turbine means operatively connected to said heat extraction means to receive and be driven by said stream.

31. The system of claim 29, wherein said heat extraction means comprises a binary system having power fluid circuit means in which heat energy is transferred from said steam to power fluid means, said power fluid circuit means having turbine means therein which is driven by said power fluid means.

32. In a geothermal energy system having a production well that provides to an underground source of high temperature, highly saline geothermal brine and heat extraction means connected to said production well to receive said brine from said well, a system for reducing mineral scaling and corrosion which comprises:

a source of non-geothermal water that is much less saline than said geothermal brine, a fluid mixing zone in said system upstream of said heat extraction means, conduit means extending from said source of non-geothermal water to said fluid mixing zone, and means for moving said non-geothermal water from its said source through said conduit means into said mixing zone for mixing with and reducing the salinity of said geothermal brine, said fluid mixing zone being down in said production well above said geothermal brine source, a portion of said conduit means extending down through a portion of said production well to said mixing zone.

33. In a geothermal energy system having a production well that provides access to an underground source of high temperature, highly saline geothermal brine and heat extraction means connected to said production well to receive said brine from said well, a system for reducing mineral scaling and corrosion which comprises:

a source of non-geothermal water that is much less saline than said geothermal brine, a fluid mixing zone in said system upstream of said heat extraction means, conduit means extending from said source of non-geothermal water to said fluid mixing zone, means for moving said non-geothermal water from its said source through said conduit means into said mixing zone for mixing with and reducing the salinity of said geothermal brine, said fluid mixing zone being down in said production well above said geothermal brine source, a portion of said conduit means extending down through a portion of said production well to said mixing zone, said production well having a cemented-in production casing, a production liner removably mounted within said casing, said liner having an outside diameter that is less then the inside diameter of said casing so as to define an annulus between said casing and said liner which serves as said portion of said conduit means, said non-geothermal water flowing down through said annulus protecting said casing from the corrosive effects of said geothermal brine.

34. The system of claim 33, wherein said fluid mixing zone is within the lower portion of said production liner, said liner having radial perforations in its said lower portion through which said non-geothermal water flows from said annulus into said mixing zone.

35. The system of claim 33, wherein said non-geothermal water has not more than approximately 50,000 ppm by weight of chloride salt content.

36. The system of claim 33, wherein said non-geothermal water has not more than approximately 35,000 ppm by weight of chloride salt content.

37. The system of claim 33, wherein said non-geothermal water has not more than approximately 20,000 ppm by weight of chloride salt content.

38. The system of claim 33, wherein said non-geothermal water has not more than approximately 3500 ppm by weight of chloride salt content.

* * * * *